Dec. 28, 1965   T. A. GODFREY ETAL   3,225,772
CIGAR AND METHOD OF APPLYING A WRAPPER
Original Filed Jan. 9, 1961   10 Sheets-Sheet 1

INVENTORS.
THOMAS A. GODFREY
STERLING T. GUSTAVSON
BY
ATTORNEY

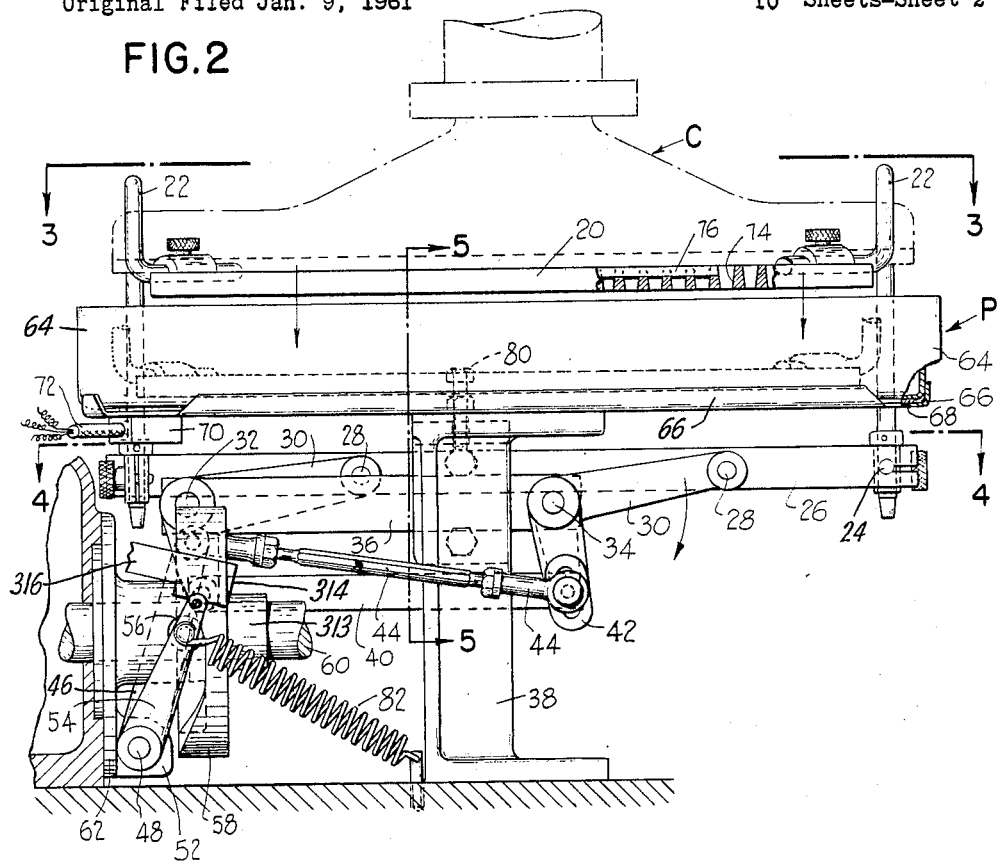
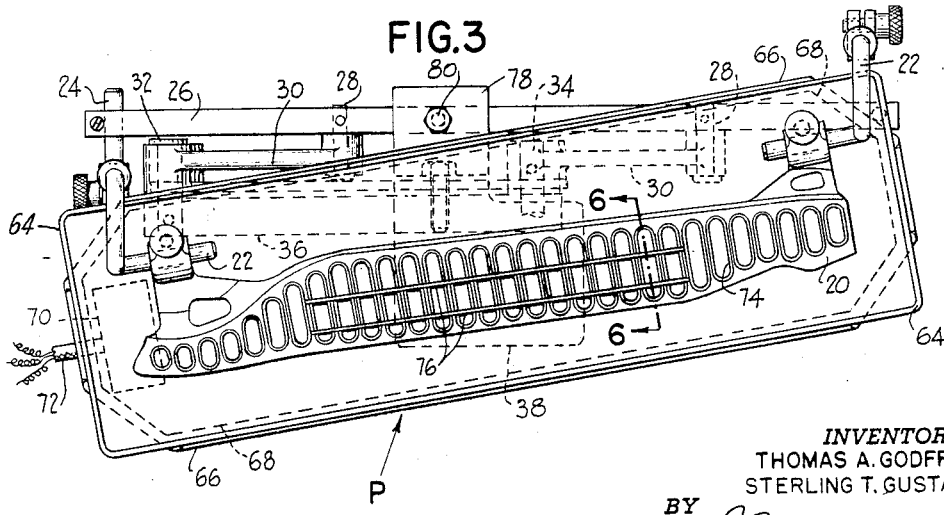

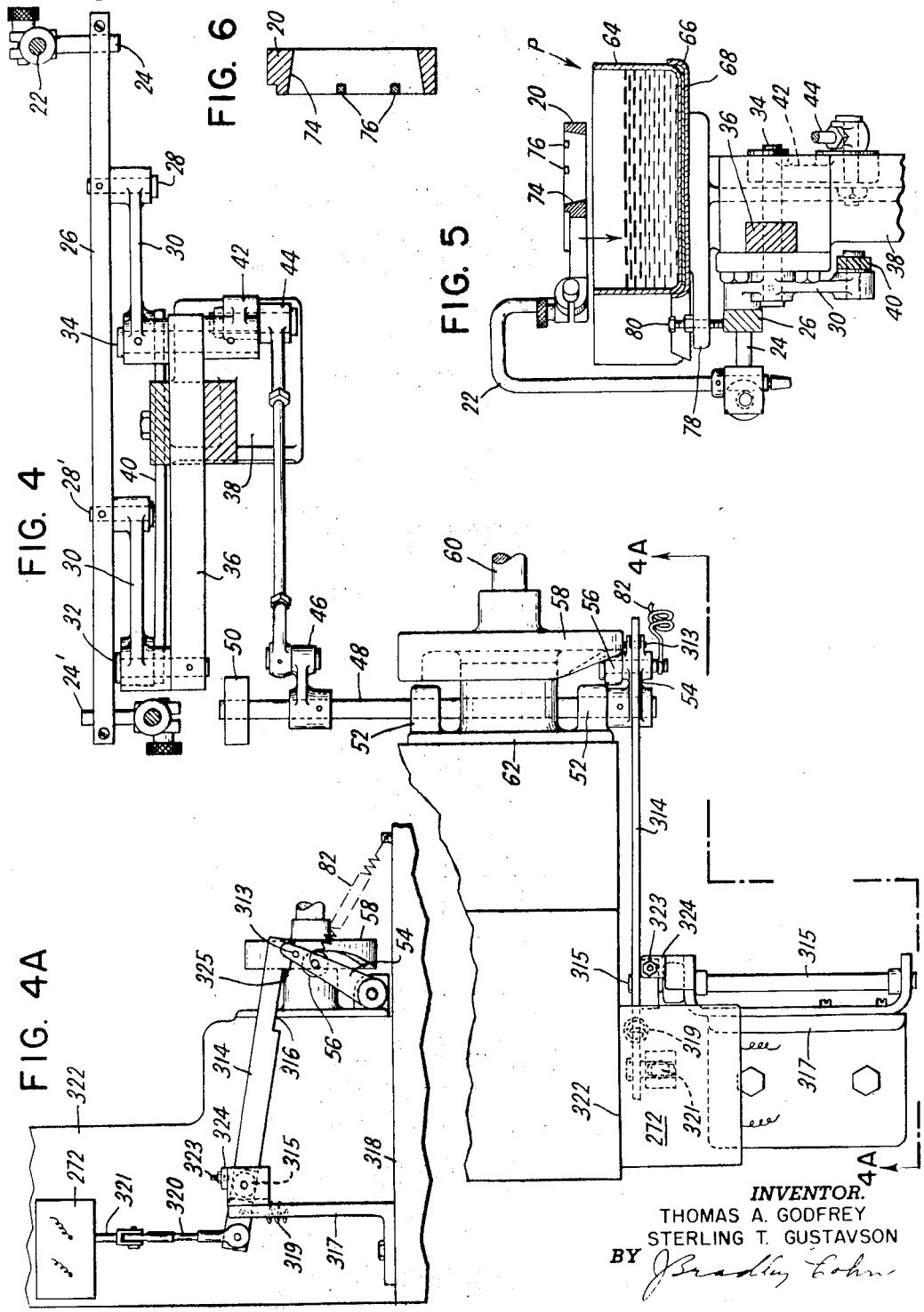

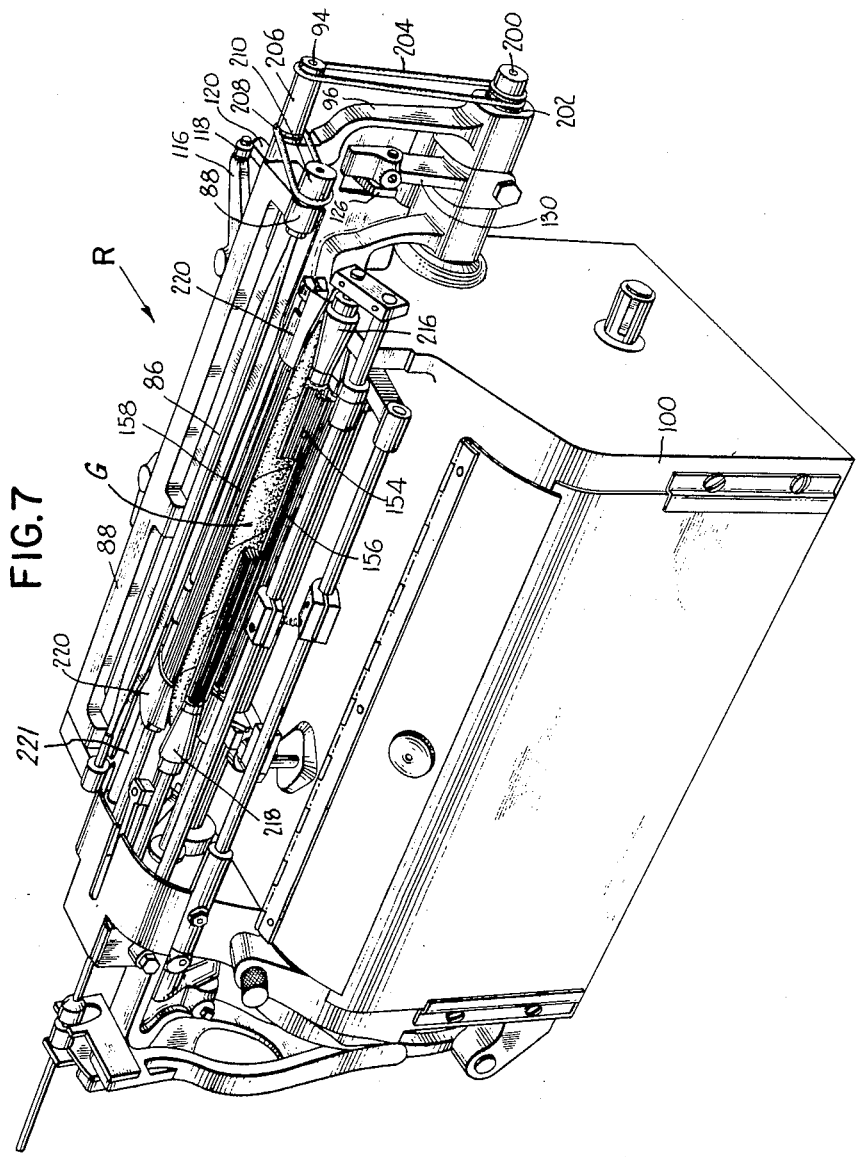

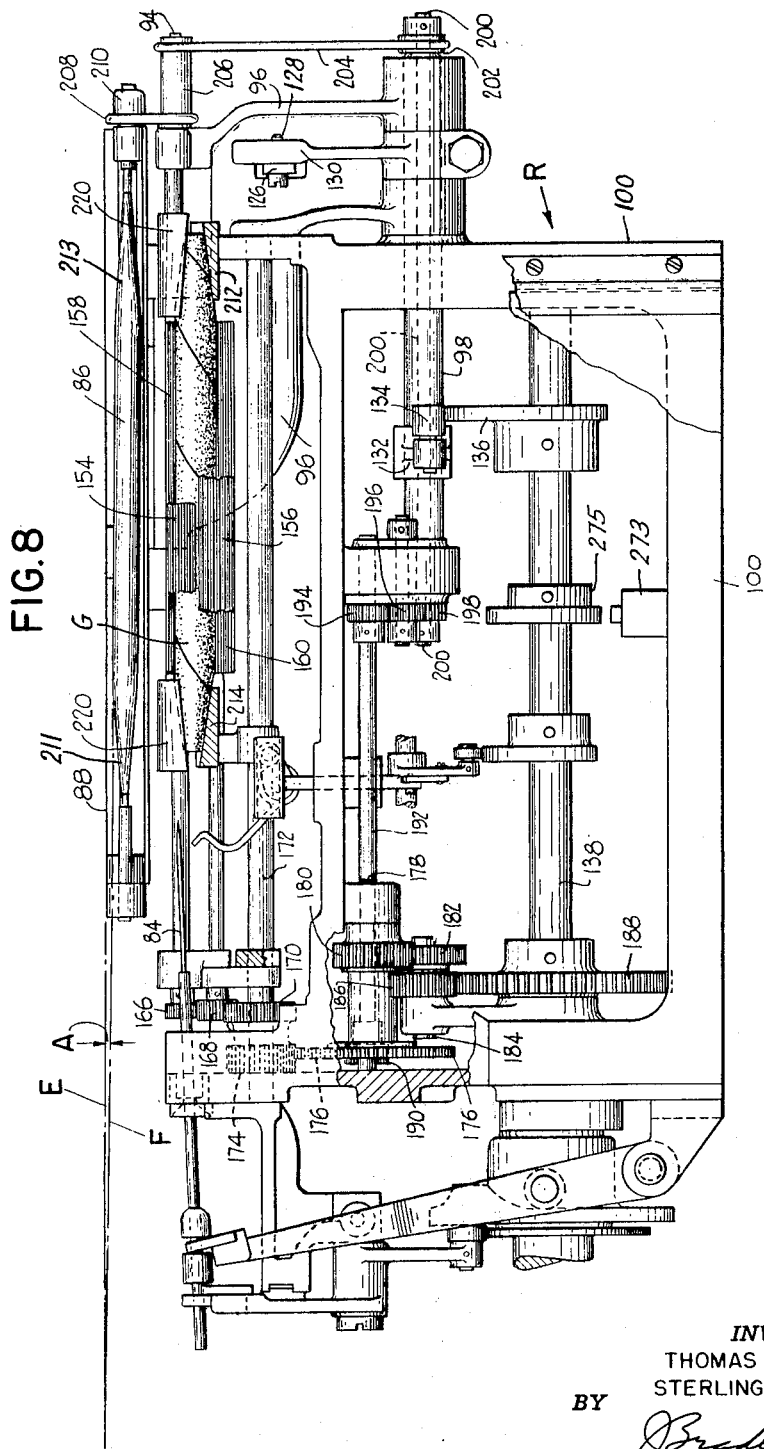

Dec. 28, 1965 T. A. GODFREY ETAL 3,225,772
CIGAR AND METHOD OF APPLYING A WRAPPER
Original Filed Jan. 9, 1961 10 Sheets-Sheet 6
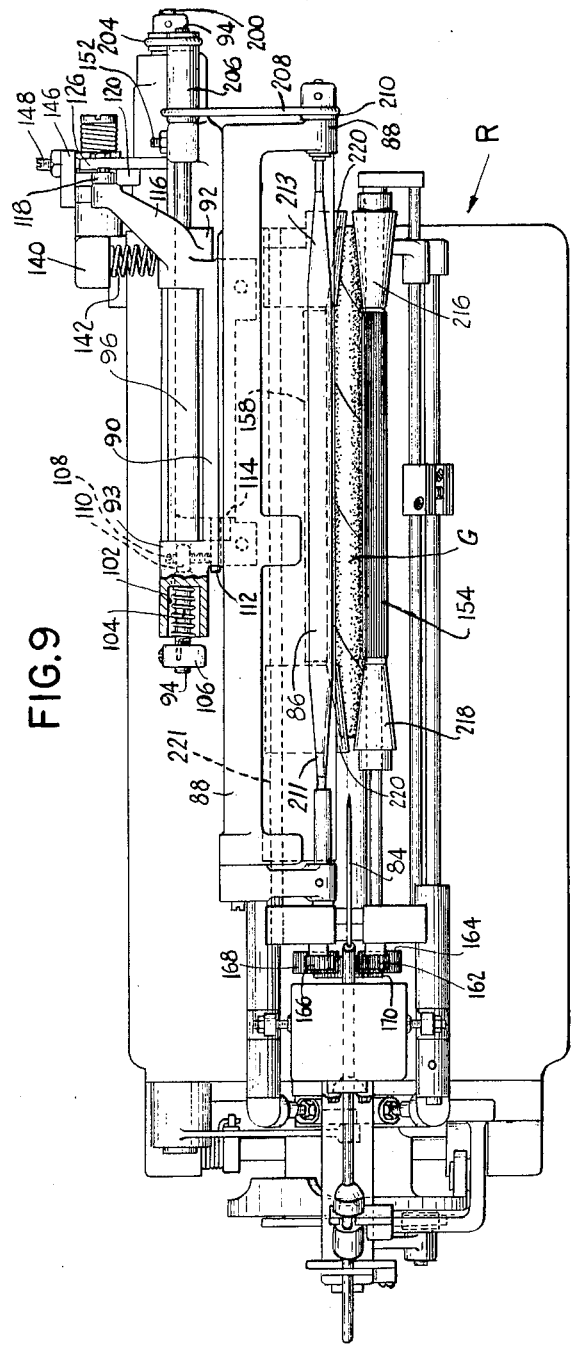
INVENTORS.
THOMAS A. GODFREY
STERLING T. GUSTAVSON
BY
ATTORNEY INVENTORS
THOMAS A. GODFREY
STERLING T. GUSTAVSON
BY
*Bradley Cohn*
ATTORNEY

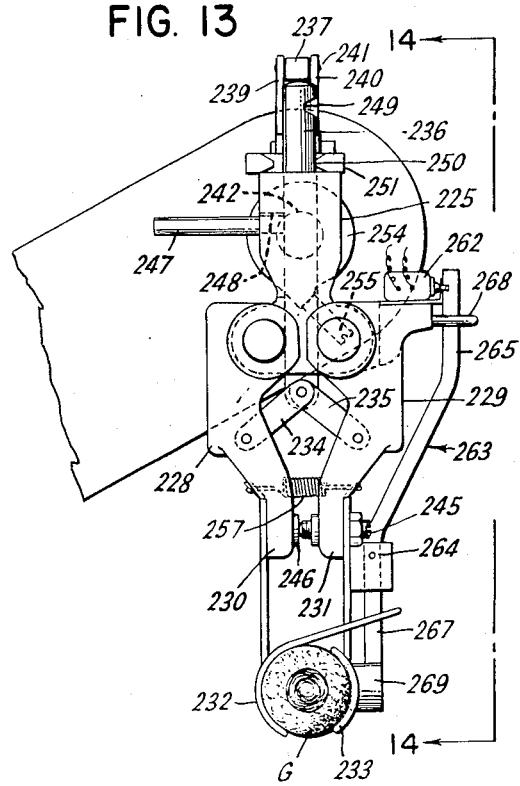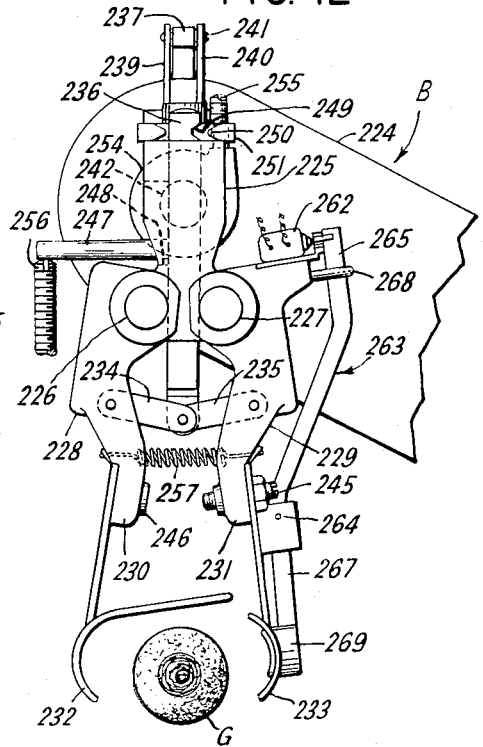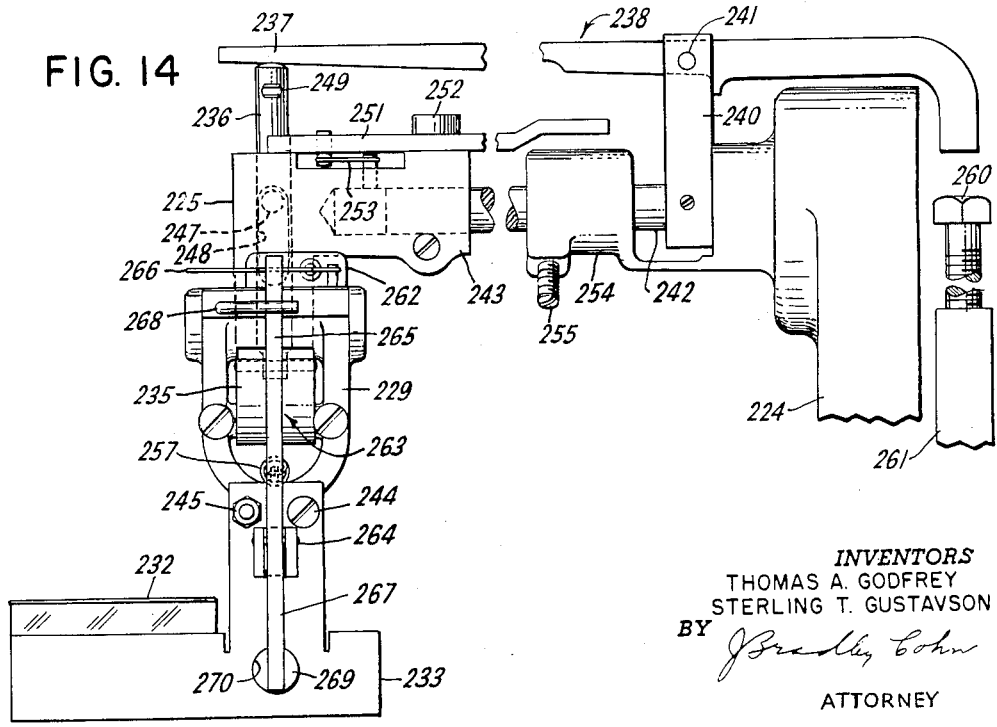

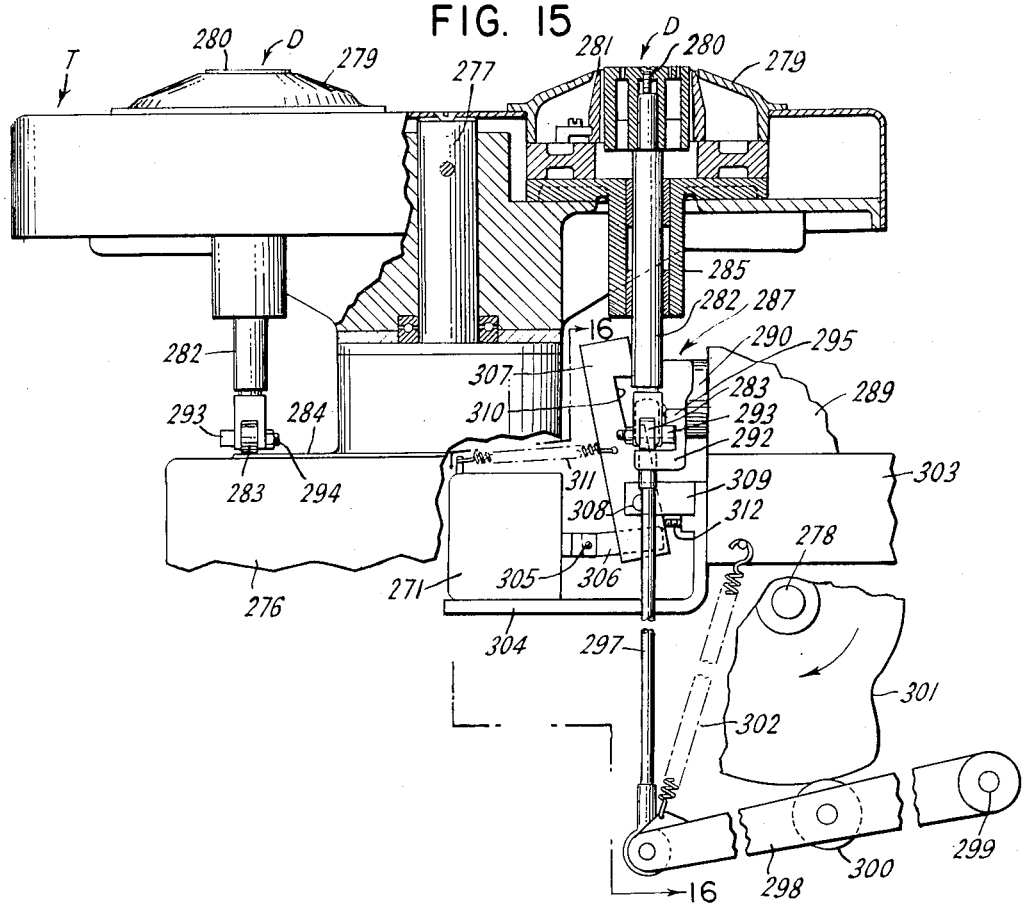
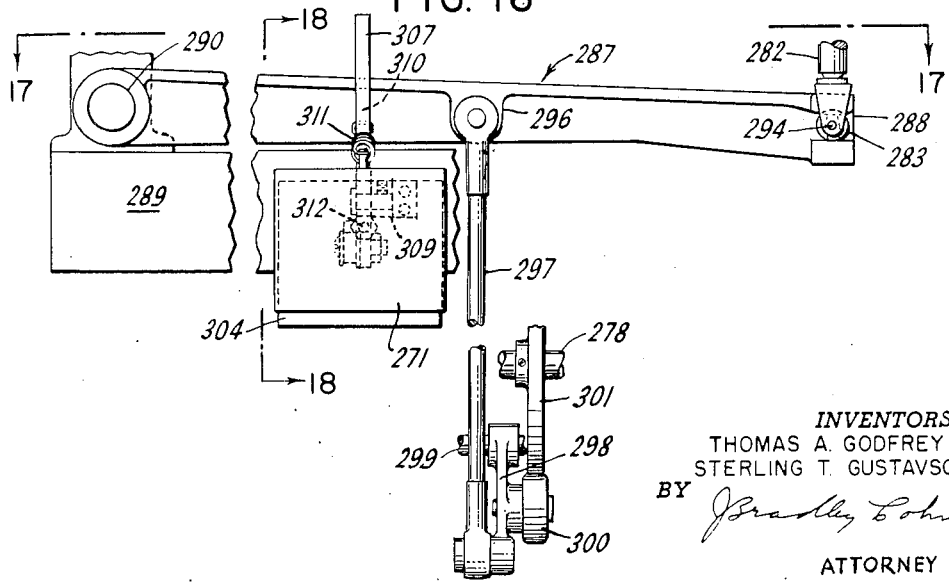

Dec. 28, 1965 T. A. GODFREY ETAL 3,225,772
CIGAR AND METHOD OF APPLYING A WRAPPER
Original Filed Jan. 9, 1961 10 Sheets-Sheet 10

INVENTORS
THOMAS A. GODFREY
STERLING T. GUSTAVSON
BY
*J Bradley Cohn*
ATTORNEY

United States Patent Office 3,225,772
Patented Dec. 28, 1965

3,225,772
CIGAR AND METHOD OF APPLYING
A WRAPPER
Thomas A. Godfrey, Elmont, and Sterling Ture
Gustavson, Rosedale, N.Y., assignors to American
Machine & Foundry Company, a corporation of
New Jersey
Original application Jan. 9, 1961, Ser. No. 81,361, now
Patent No. 3,139,091, dated June 30, 1964. Divided
and this application Oct. 9, 1963, Ser. No. 315,004
4 Claims. (Cl. 131—8)

This application is a division of application Serial Number 81,361, filed January 9, 1961, now Patent 3,139,-091, granted June 30, 1964 and claim is made to all of the equitable and legal benefits derivable therefrom.

This invention relates to the manufacture of cigars and cigar-like products. More particularly, it relates to manufacturing a cigar which may be divided by cutting and is capable of being smoked from either end.

It is an object of the invention to devise a method for making a cigar of sufficient length so it may be severed to form two cigars. Producing a cigar in this manner also doubles the unit production rate of the machine. It is accordingly an object of the invention to devise a method of increasing the productivity of a cigar machine.

A conventional cigar cannot be cut in half and both halves smoked for several reasons, not the least important of which is that the wrapper will unravel. Indeed, in a conventional cigar the wrapper will unravel if it is lighted at the wrong end. Accordingly, it is an object of the invention to provide a method for manufacturing a cigar which may be smoked from either end and which further may be divided any number of times and the divided portions individually smoked.

Still another object of the invention is to make a cigar capable of having both ends open and/or tapered.

It is an object of the invention to manufacture on a machine a cigar whose wrapper is glued substantially throughout its extent so that it cannot unravel.

It is an object of the invention to provide a method of so applying paste to a wrapper and then applying the pasted wrapper spirally about a cigar without impairing the layer of paste.

Another object is to provide a method using a tensioning device over which the wrapper may be drawn without impairing the layer of paste thereon.

It is also an object to roll such a cigar in a wrapper so that both ends are tapered and/or opened.

It is a further object of the invention to dispose a controlled amount of paste over a wrapper and then during the wrapper applying operation smooth or level the paste without removing any material amount of it.

With the foregoing and other objects not specifically mentioned in view, the method of the present invention consists in providing a momentary dwell in the travel of a wrapper carrier of a cigar machine as the carrier moves toward a cigar wrapping device, and during the dwell applying paste substantially to the entire surface of a wrapper held by the carrier. Thereupon the wrapper is delivered to a cigar wrapping device and as the wrapper is withdrawn from the carrier by the wrapping device the paste is smoothed without removing any material amount of it by drawing the wrapper from the carrier over a tensioning roller which is rotated with a peripheral speed approximately that of the speed of the wrapper carrier. The speed of wrapper withdrawal by the cigar wrapping device is slightly greater than the peripheral roller speed and wrapper carrier speed and induces the necessary tension in the wrapper to obtain a smoothly wrapped cigar and, further, the roller is slightly canted relative to the horizontal surface of the wrapper carrier whereby to obtain a slightly higher tension in the outer or overlapping edge of the seam of a spirally wrapped cigar. The tensioning of the wrapper, during the wrapper rolling operation, is such that the wrapper is tensioned lengthwise thereof to provide a maximum tension at the underlying edge portion and with a substantially uniform tension gradient transversely of the wrapper.

The method of the present invention utilizes in the wrapping end of a cigar machine a cigar wrapping device, a carrier to deliver a cigar wrapper to said device from a wrapper die turret, a paster to apply paste to said wrapper before it is delivered to the wrapping device, and means for tensioning the pasted wrapper as it passes from the carrier to the wrapping device.

Means are provided to cause said carrier to dwell momentarily over the paster. The latter includes a heated paste reservoir and a horizontal paste applying plate adapted to reciprocate vertically between a submerged position in the paste reservoir and an elevated position into contact with the underside of a wrapper on the carrier during the dwell of the latter over the paster. The plate configuration is substantially that of a die cut wrapper on the carrier and the plate is also provided with a plurality of slots to permit drainage of excess paste as the plate is raised from the paste reservoir.

The wrapping device includes a nest of driven rollers, and a tension roller over which the pasted wrapper passes from the carrier as the latter moves over and across the roller, whereby to smooth the paste on the wrapper and to tension the latter as it is wrapped around a cigar bunch rotating in the nest of rollers. To this end the tension roller is drivingly coupled to one of the rollers in the nest whereby it is driven at a peripheral speed slightly less than that at which the wrapper is withdrawn from the carrier. Moreover, the tension roller is slightly canted relative to the bottom horizontal surface of the carrier whereby to impart greater tension to the edge of the cigar wrapper which form the overlapping edge of a spiral wrapper seam of a cigar.

One of the rollers in the nest is shortened and at the ends thereof are freely mounted rotatable conical rollers to engage and taper the ends of a cigar bunch when such cigars are being rolled. In addition ironing members are mounted within the roller nest and adapted to engage and smooth the ends of cigars as they are rolled.

The novel features which we believe to be characteristic of the invention are set forth with particularity in the appended claims. The invention itself, however, both as to its organization and method of operation may be understood by reference to the following description taken in connection with the accompanying drawings in which:

FIG. 2 is a front elevation of the paste applying device and its actuating mechanism;

FIG. 3 is a plan view of the same taken on line 3—3 of FIG. 2;

FIG. 4 is a sectional plan view of the actuating mechanism for the paste applying mechanism taken on line 4—4 of FIG. 2;

FIG. 4A is a front elevation of same taken on the line 4A–4A of FIG. 4, showing the solenoid actuated latch mechanism for inactivating the paste applying device when a cigar bunch is not present in the bunch transfer device;

FIG. 5 is a partial sectional end elevation of the paste applying device taken on line 5—5 of FIG. 2;

FIG. 6 is a sectional end elevation of the paste applying bar taken on line 6—6 of FIG. 3;

FIG. 7 is a perspective view of the cigar wrapping mechanism;

FIG. 8 is a front elevation of the cigar wrapping mechanism;

FIG. 9 is a plan view of the same;

FIG. 12 is a partial side elevation of the cigar bunch transfer device including a sensing switch for indicating absence of a cigar bunch, the transfer device being shown in position to pick up a cigar bunch from a conventional bunch crimper;

FIG. 13 is a similar elevation showing the transfer device in position to deposit a cigar bunch onto the wrapping device;

FIG. 14 is a front elevation of same taken on the line 14—14 of FIG. 13;

FIG. 15 is a fragmentary sectional elevation of a wrapper die turret showing the solenoid actuated latch mechanism for inactivating the mechanism for delivering a wrapper to the carrier when a cigar bunch is not present in the cigar transfer device;

FIG. 16 is a partial sectional elevation taken on the line 16—16 of FIG. 15;

Figure 1:
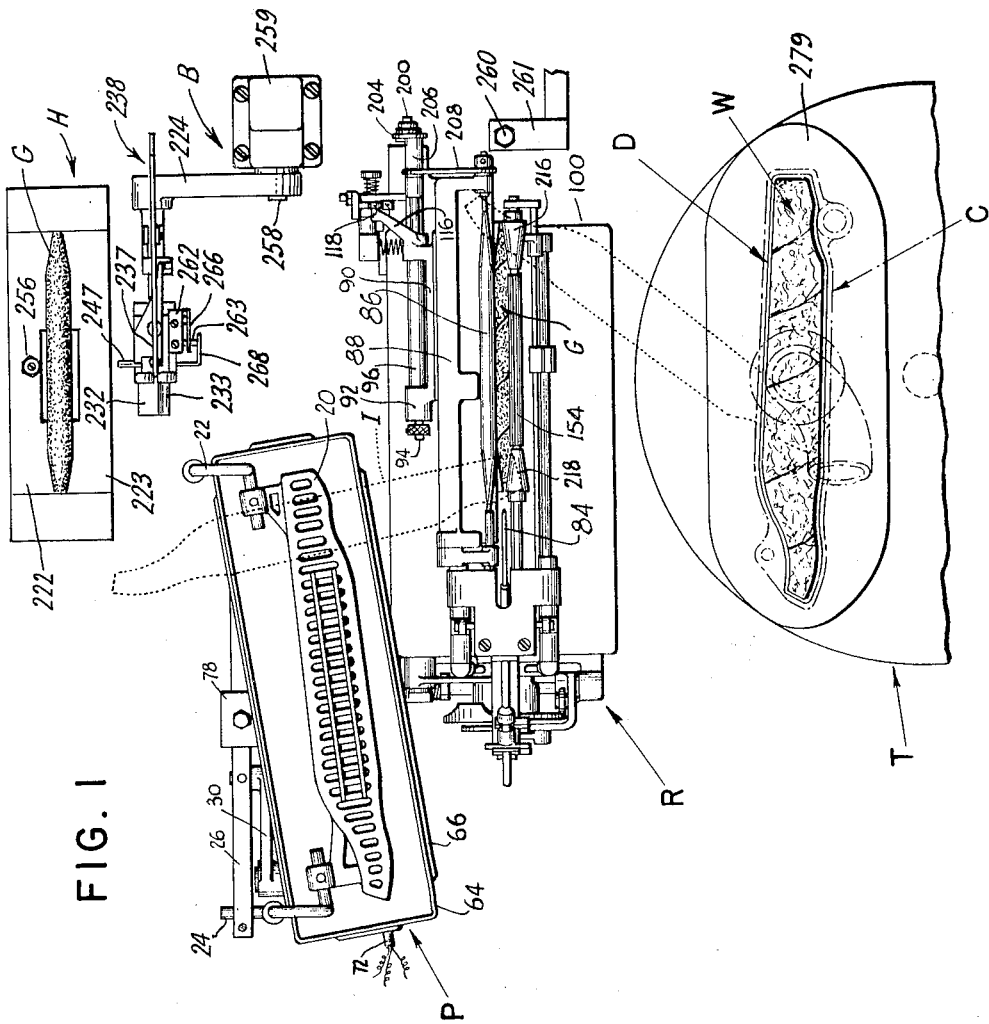
FIG. 1 is a plan view illustrating a die, a wrapper carrier, a paste applying device, a wrapping device and a cigar bunch transfer device which constitute the essential mechanisms for automatically applying a wrapper on a cigar bunch.

With reference to FIGS. 1 to 6, a cigar wrapper W previously cut on a die D of a turrent T is lifted from said die by means of a wrapper carrier C in a manner well known in the art and disclosed in U.S. Patent No. 1,888,788 issued to S. Clausen. The carrier C along its path to a wrapping device R momentarily dwells above a suitable paste applying device P where paste is applied substantially to the entire surface of the wrapper W held by carrier C. From the paste applying station the carrier C moves to the cigar wrapping device R where wrapper W is deflected from the carrier and rolled onto a bunch previously deposited in wrapping device R by means of a bunch transfer device B.

Since it is an object of this invention to produce a cigar with two open ends and of considerable length with the intention of cutting said cigar in its center to obtain two separate cigars, it is essential that the wrapper of the cigar be secured by paste on its entire surface contact with the bunch.

The paste is applied to the wrapper by means of a paste applying plate 20. A dwell must be provided in the motion of the carrier at this point. The paste applying plate 20 forms part of the paste applying device P and is adjustably mounted on a pair of suitably shaped supporting rods 22, each of which at its lower end is adjustably secured to its associated one of a pair of horizontal rods 24, each of which in turn is adjustably mounted and projects from a horizontal lifter bar 26. The lifter bar 26 is supported by a pair of studs 28 projecting from and held by the free ends of a pair of bell crank levers 30 one of which is pivotally mounted on a stud shaft 32 while the other is mounted to a shaft 34 (FIG. 2). Stud shaft 32 and shaft 34 are journalled in a horizontal bar 36 adjustably secured to a suitable bracket or stand 38 mounted to the bed of the cigar machine. Bell crank levers 30 are coupled to each other by a link 40 whereby to impart vertical parallel motion to the lifter bar 26 upon oscillation of the bell cranks. To shaft 34 is also secured an arm 42 to the free end of which is adjustably pivoted one end of a connecting rod 44 while the other end of said rod is pivotally connected to an arm 46 mounted on a shaft 48 supported by suitable bearing lugs 50 and 52. To shaft 48 is also secured a cam lever 54 carrying on its free end a cam roller 56 which engages with a suitable face cam 58 mounted on a shaft 60 which is supported by a suitable bearing bracket 62. A tension spring 82 working between an intermediate portion of lever 54 and the cigar machine bed biases the cam roller 56 in to contact with the cam 58.

Rotation of shaft 60 and cam 58 transmits oscillating motion through cam lever 54 to arm 46 which in turn through connecting rod 44 transmits oscillating motion to the arm 42 on shaft 34. Since bell crank levers 30 on shaft 34 are connected to each other by the link 40 as described above they will effect a vertical reciprocation of the paste applying plate 20 through horizontal bar 26 and supporting rods 22. Paste applying plate 20 in its lowermost position dwells near the bottom of a paste reservoir 64 and in its uppermost position contacts the lower side of a wrapper carried or held by the carrier C. Paste reservoir 64 is removably supported by a tray 66 secured to the top portion of the stand 38.

An even and uniform paste temperature is maintained throughout the reservoir by an underlying heating plate 68 which through terminal block 70 and a cable 72 is connected to a suitable source of current. The paste applying plate 20 is provided with suitable frusto-conical slots 74 to permit draining of surplus paste when emerging from the reservoir to apply paste to the bottom face of the waiting wrapper. To apply a slightly larger amount of paste to the center portion of the wrapper the paste applying plate 20 may be provided with additional longitudinal bars 76 as illustrated in FIGS. 3, 5 and 6.

The shape of the paste applying plate 20, of course, conforms exactly with the shape of the wrapper for a particular cigar. The substantially uniform application of paste to the entire contact surface of the wrapper provides even shrinkage of the wrapper during the drying process of the cigar to give a better, smoother-looking cigar.

To arrest the paste applying plate 20 at the proper height when contacting the wrapper held by the carrier, a vertically adjustable stop screw 80 in a lug 78 on the stand 38 is adapted to contact the top edge of the lifter bar 26 and arrest the same when reaching its topmost position. The tension spring 82 anchored between the cigar machine bed and the cam lever 54 provides for lost motion but otherwise keeps the cam lever 56 in contact with the cam 58.

As mentioned heretofore, the wrapper W is forwarded by the carrier from the paste applying station to the wrapping device R where the tuck end of the wrapper is deflected from the carrier C onto a cigar bunch by a tuck needle 84 and then rolled onto the cigar bunch previously inserted by the bunch transfer device B in a nest of rollers of the wrapping device. The nest of rollers, which rotates the bunch, operates basically as shown and illustrated in U.S. Letters Patent 2,445,308 issued to C. F. Randolph. However, to produce a smooth cigar with two open tapered ends, new and novel means are provided to guide the fully pasted wrapper onto the cigar, now to be described with reference to FIGS. 7 to 11.

A tension roller 86 provides the desired tension to the wrapper as it is pulled from the carrier and rolled about the rotating bunch without disturbing the layer of paste on the wrapper. Roller 86 is supported in suitable bearings in a bracket 88 secured to a supporting member 90. The supporting member 90 is provided with two spaced bearing lugs 92, 93 which are oscillatably journalled on a horizontal shaft 94 mounted in the upper portion of a member 96 which in turn at its bottom portion is pivotably journalled on a sleeve shaft 98. Sleeve shaft 98 is rotatably supported in suitable bearings of the main frame 100 of the wrapping device. One of the bearing lugs 93 of the member 90 is provided with a recess 102 housing a torsion spring 104 one end of which is anchored to the bearing lug 93 while the other end is secured to a knurled knob 106 adjustably threaded on the end of the shaft 94.

The torsion spring 104 urges member 90 and consequently the roller carrying bracket 88 in an upward direction. This upward movement is checked by means of an adjustable stop screw 108 carried by a lug 110 integral with and projecting from the bearing lug 93. The free end of screw 108 engages a horizontal pin 112 extending from a lug 114 integral with and projecting from the member 96.

The bearing lug 92 is provided with an arm 116 which at its free end carries a cam roller 118 located in the path of a cam wedge 120 provided on the free end of an arm 122 pivotally mounted on a stud shaft 124 held by a suitable bracket 125 attached to the main frame 100. The center portion of the arm 122 by means of a pin and slot connection 123 is slidably coupled to one end of a link 126. The other end of link 126 is pivotally coupled by means of a pin 128 to an actuating arm 130 adjustably secured to the aforementioned sleeve shaft 98. To the sleeve 98 is secured an arm 132 which at its free end carries a cam roller 134 engaging a cam 136 mounted on the cam shaft 138 of the wrapping device R.

A bracket 125 is provided with a cup-shaped lug 140 which supports one end of a compression spring 142 whose other end engages a cup-shaped recess 144 in the member 96. Compression spring 142 urges member 96 to its forwardmost position when cam roller 134 is on the low portion of cam 136.

This forward position of member 96 is controlled and may be adjusted by means of a suitable stud 150 carried by the member 96 and adapted to contact the rear edge of a suitable portion of the main frame 100 of the wrapping device. The cam arm 122 is also provided with a lug 146 which supports a stud 148 protruding through the lug into the path of the rear end of the link 126. Movement of the cam roller 134 and arm 132 from the low to the high portion of cam 136 produces a clockwise movement of the sleeve shaft 98 (as viewed in FIG. 10). This also moves actuator arm 130 secured on sleeve shaft 98 in the same clockwise direction. This will move connecting link 126 to the right so its rear edge contacts the stud 148. Continued movement then swings cam arm 122 clockwise. Clockwise rotation of cam arm 122 causes cam wedge 120 to engage and lift the cam roller 118 of arm 116. Since cam arm 116 is integral with the bracket 90 which in turn carries the tension roller 86, an upward motion of arm 116 will effect a downward motion of brackets 88 and 90 and consequently of the tension roller 86. During continued backward movement of actuator arm 130 the free end of the latter contacts an adjustable stud 152 carried by the member 96 which then is moved also in a clockwise or rearward direction. Therefore, when cam roller 134 reaches the high portion of cam 136 the tension roller 86 is in its lowermost and rearward position where it remains until a bunch is deposited in the nest of rollers of the wrapping device R. The nest of rollers as mentioned heretofore is disclosed in Randolph Patent 2,445,308 and consists of two pairs of rollers 154, 156 and 158, 160 employed and designed for the purpose of rolling a wrapper in a spiral fashion around a cigar bunch supported in the nest of rollers. The roller nest is arranged and supported so as to open for reception of a bunch to be wrapped. Since the support as well as the opening and closing of this nest of rollers is well known in the art and clearly illustrated in the Randolph Patent 2,445,308 as well as in Halstead Patent 1,915,277, further description is not deemed necessary.

Rollers 154, 156 are drivingly coupled to each other by means of gears 162, 164 while rollers 158, 160 are coupled in like manner by means of gears 166, 168. Gears 164 and 168 mesh with a common gear 170 mounted on a shaft 172 rotatably supported in the frame 100 of the wrapping device R. To shaft 172 is secured another gear 174 which meshes with a gear 176 mounted on shaft 178. To shaft 178 is also secured a gear 180 which is modelled relative to the diameter of the bunch to be wrapped. Gear 180 in turn meshes with an intermediate gear 182 journalled on a stud shaft 184. Gear 182 is integral with another gear 186 also loosely mounted on this stud shaft. Gear 186 meshes with the main drive gear 188 secured on the cam and drive shaft 138 of the wrapping device R.

Gear 176 also meshes with a gear 190 mounted on one end of a shaft 182 to the other end of which is mounted another gear 194. Shaft 192 is rotatably supported in suitable bearing lugs which are part of the main frame 100 of the wrapping device R. Gear 194 through an intermediate gear 196 drives a gear 198 which is fixed on a horizontal shaft 200 rotatably protruding through and supported by sleeve shaft 98. To one end of shaft 200 is mounted a pulley 202 which through a belt 204 drives a double pulley 206 loosely supported on the shaft 94. Double pulley 206 by means of a belt 208 also drives the pulley 210 which is secured to the end of the tension roller 86 mentioned heretofore.

In applying the wrapper W to a bunch previously inserted in the nest of rollers of the wrapping device the wrapper W pasted over the full extent of its bottom surface is forwarded to the wrapping device by the carrier C to the position I indicated in FIG. 1. During a momentary dwell of the carrier, a tuck needle 84 deflects the tuck end of the wrapper from the carrier onto the bunch in the nest of rollers of the wrapping device in a manner well known in the art and disclosed in United States Patents to Halstead No. 1,915,277 and Durning No. 2,290,171. As soon as the tuck end of the wrapper is pressed onto the bunch by tuck needle 84 the rotation of the rollers in the supporting nest causes a withdrawal of the wrapper W from the carrier onto the bunch in a spiral fashion. During the wrapping a proper movement of the carrier aids this withdrawal of the wrapper W.

Figure 11:
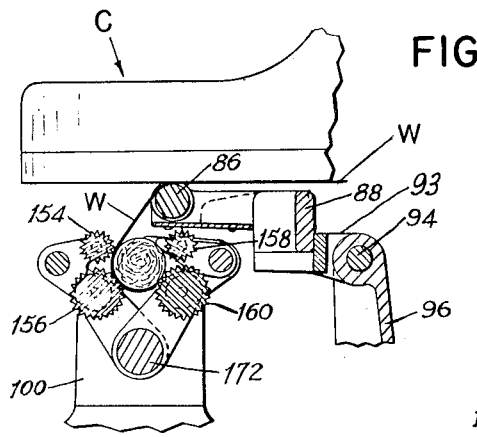
FIG. 11 is a partial sectional end elevation illustrating the wrapper applying mechanism in conjunction with the wrapper carrier during the wrapper applying action.
Figure 17:
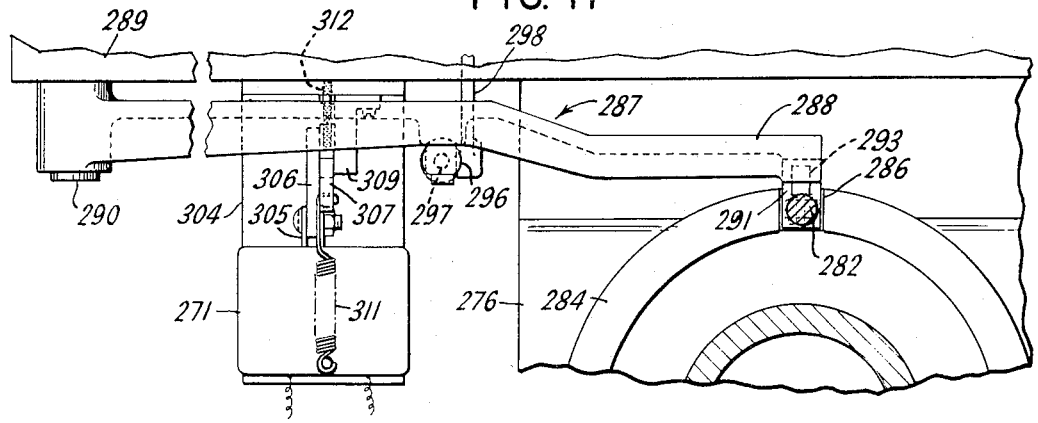
FIG. 17 is a partial sectional plan view taken on the line 17—17 of FIG. 16.

In order to obtain a smooth cigar it is essential that the wrapper rolled onto the rotating bunch must be kept under tension during the wrapping process, and it is in order to provide such tension without removing the applied paste that there is provided the tension roller 86 over which the wrapper W is pulled from the carrier onto the rotating bunch (see FIG. 11). This tension roller 86 is mounted at a slight angle in relation to the horizontal bottom surface of the carrier and thus creates a slightly higher tension at the edge of the wrapper forming the outer spiral seam of the cigar. This angle or displacement of the tension roller in relation to the horizontal bottom surface of the wrapper carrier C is illustrated by the angle A appearing in phantom lines in FIG. 8 where the top line E represents the plane of the horizontal bottom surface of the carrier and the bottom line F represents a plane tangent to the surface of the tension roller 86. The upper surface of tension roller 86 is but slightly spaced from the bottom surface of carrier C.

Tension roller 86 also has the beneficial effect of spreading the paste applied to the wrapper by the paste applying plate 20 evenly over the entire bottom surface of the wrapper. In order to avoid any scraping effect by tension roller 86 on the wrapper W, the tension roller is driven at an equal or a proportional peripheral speed to the rollers which form the nest in which the wrapper is rolled on the cigar. In a preferred operation of the wrapping device in accordance with this invention the peripheral speed of the tension roller and the speed of the wrapper carrier during delivery of the wrapper are the same. The peripheral speed of the rollers 154, 156, 158 and 160 rotating the cigar bunch is, however, slightly higher. This produces tension on the wrapper without, however, producing any appreciable slippage of the wrapper with respect to the surface of the tension roller. Additionally, the tension roller is tapered at each end in a manner corresponding to the taper of the cigar bunch. Reference to FIG. 8, shows that tension roller 86 has a left hand tapered end 211 and a right-hand tapered end 213. This maintains the peripheral speed relationship between the bunch and the tension roller. With reference to FIG. 1, it may be seen that when the wrapper is being delivered in the phantom line position shown at I, the wrapper will be engaging the tapers of both tension roller and bunch. In the same figure the unreferenced phantom line position shows the wrapper similarly engaging the taper of bunch and roller at the other end.

Figure 10:
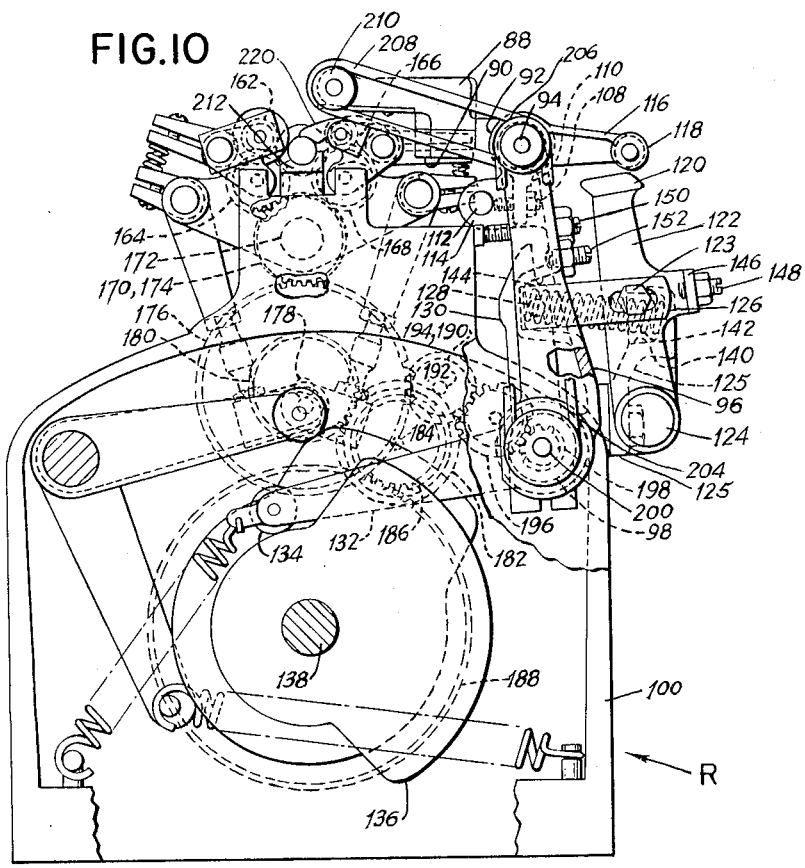
FIG. 10 is an end elevation taken from the right of FIG. 8.

The driving mechanism of the tension roller 86 disclosed in FIGS. 8 and 10 clearly illustrates the synchronization of the tension roller with the nest of rollers. Since it is necessary to change the peripheral speed of the nest of rollers when forming cigars of different diameters, the model change gears 180, 182 may be replaced with larger or smaller gears to effect the desired peripheral speed. A change of said gears, of course, automatically effects the circumferential speed of the gears and pulleys driving the tension roller 86 so that the circumferential speed of the latter always remains in the same speed relation with the circumferential speed of the nest of rollers regardless of the change of the above mentioned model gears.

Referring to FIG. 8, the tapered ends of the bunch inserted in the nest of rollers extend beyond the ends of the rollers and are supported in fixed concave members 212, 214 made to the nominal taper of the ends of the bunch. In addition, the ends of roller 154 (see FIG. 9) carry axially aligned, loosely mounted frusto-conical rollers 216, 218 which engage the tapered ends of the bunch to assume a smooth and even adherence of the wrapper at such ends of the bunch. As further assurance of smooth wrapper adherence at the tapered ends of bunches and in order to prevent tobacco in the tapered ends of the cigar bunch from expanding during the wrapper applying operation, a pair of concave ironers 220, made to the nominal taper of the bunch ends and adapted to engage the bunch tapers, are suitably mounted on a shaft, or the rod, 221 extending alongside the nest of cigar rollers.

Since the construction and operation of the mechanism of the tuck needle 84 is well known in the art and disclosed in Durning Patent 2,290,171 as well as Halstead Patent 1,915,277, further description thereof is not deemed necessary at this point.

The present invention also includes electrically controlled mechanism for preventing delivery of a wrapper from the wrapper die turret of a cigar machine to the wrapper carrier if a cigar bunch is not being transferred to the roller nest of the wrapping device and for simultaneously preventing application of paste to the bottom of the wrapper carrier when a wrapper is not delivered to said carrier under the aforesaid condition.

Referring to FIG. 1, there is shown a cigar bunch transfer device B positioned between a cigar bunch crimper H and the cigar wrapping device R. As cigar bunches G are delivered to the jaws 222, 223 of the crimper H for final molding, they are successively picked up by the transfer device B and deposited in the nest of rollers of the wrapping device R. To this end, an arm 224 of the transfer device B, carrying cigar bunch grippers (to be described) is arranged to oscillate between the crimper H and the roller nest of the wrapper R to grip a cigar bunch G from the crimper H and, after oscillating to a position over and above the nest of rollers of wrapper R, to release the cigar bunch and deposit it in the nest of wrapping rollers for the wrapping operation.

Referring now to FIG. 12, which shows a portion of the transfer mechanism in position to pick up a cigar bunch G, and to FIGS. 13 and 14 which show the transfer mechanism in position to deposit the cigar bunch on the wrapper rollers, there is illustrated the construction of the gripper fingers. To a sleeve 225 are attached two hinge pins 226 and 227 on which are pivoted two depending arms 228 and 229 having lugs 230 and 231, respectively, mounting gripper jaws 232 and 233, respectively, interconnected by toggle links 234 and 235, which serve to keep the grippers fully open when a gripper operating stem 236, disposed for vertical sliding movement in sleeve 225, is pushed down by engagement of an arm 237 of a lever 238 with the top of stem 236. The lever 238 is pivoted at 241 between bracket plates 239 and 240 secured to a shaft 242 which is journalled in the outer end of transfer arm 224, the outer end of the shaft 242 being received and clamped within a split-block extension 243 of vertical sleeve 225. The gripper jaws 232 and 233 are secured to lugs 230 and 231 by suitable screws 244 and, in addition, an adjustable screw and lock nut assembly 245 not only serves to secure the jaw 233 to lug 231, but the screw extends through lug 231 and abuts a boss 246 on lug 230 to limit the movements of jaws 232 and 233 towards one another and thereby prevent the jaws from crushing the bunch held therein. The jaws are suitably adjusted by means of screw and nut assembly 245 to hold a bunch lightly without application of excess pressure which might cause damage to the bunches. The toggle links 234 and 235 are hinged to the bottom of stem 236, and from an intermediate portion of the latter extends a horizontal pin 147 transversely slidable in a vertical direction in a vertical slot 248 of the sleeve 225, and constituting a trigger for effecting closure of jaws 232 and 233.

While the transfer arm 224 oscillates to the bunch pick-up position, means are provided to maintain the jaws in a spread condition. The upper end of stem 236 is provided with an indent 249 which, when the jaws 232 and 233 are spread and the stem 236 consequently is in its lowermost position, is adapted to receive in locking engagement a detent 250 on one end of a lever latch 251, the lever being pivoted at 252 to the block 243 and being normally biased by means of a spring 253 so that the detent 250 rides on the surface of stem 236 and tends to engage the indent 249 when the stem is in lowermost position, thus-positively locking the jaws 232 and 233 in a spread condition. When the transfer arm reaches the bunch pick-up position at crimper H the stem latch 251 is adapted to be disengaged to permit the gripper jaws to be actuated to pick up a cigar bunch. A boss 254 extending from transfer arm 224 freely received over shaft 242 is provided with a stud 255 which, in the position of the arm shown in FIG. 12 (cigar pick-up position), is adapted to pivot the latch 251 out of engagement with stem 236 against the bias of latch spring 253. Thereupon, under continued downward descent of transfer arm 224, the horizontal trigger pin 247 on stem 236 presses against the top of a vertical stud 256 (see also FIG. 1) adjustably mounted on the bunch crimper H. This will cause toggle links 234 and 235 to break the toggle so that after passing beyond dead center, a tension spring 257 working between gripper arms 228 and 229 will cause the gripper jaws 232 and 233 to close about the cigar bunch G, whereupon the transfer arm 224 reverses its oscillation to transfer the bunch G to the position shown in FIG. 13 and 14 over the wrapping device (see also FIG. 2).

The construction and operation of mechanism for oscillating the transfer arm 224 on a shaft 258 extending from a bracket 259 (FIG. 1) is well known in the art of cigar bunch transfer devices for cigar making machines, and reference may be had to U.S. Patent 2,334,174 granted to S. Clausen on November 16, 1943, for a typical embodiment. It is sufficient herein to note, since said mechanism form not part of the present invention, that, by means of a kinematic train coupling transfer arm rock shaft 258 with bunch gripper support shaft 242, as the transfer arm is oscillated the shaft 242 also is oscillated to maintain the gripper unit with its axis perpendicular throughout the entire swing of the transfer arm 224.

At the arrival of the transfer arm 224 at the wrapping station (see FIGS. 1, 13 and 14) the lever 238 atop the gripping unit impinges against the top of an adjustable stop screw 260 mounted in a bracket 261 adjacent the wrapping device R. This action pivots the lever 238 into contact with the top of stem 236 to force the latter down and cause the toggle links 234 and 235 to spread grippers 232 and 233 apart, thus releasing the bunch G and depositing same on the roller nest of the wrapping device R. The transfer arm 224 then returns with the gripper jaws open and so locked by means of latch 251 associated with stem 236 ready to receive another cigar bunch from the crimper H.

Figure 19:
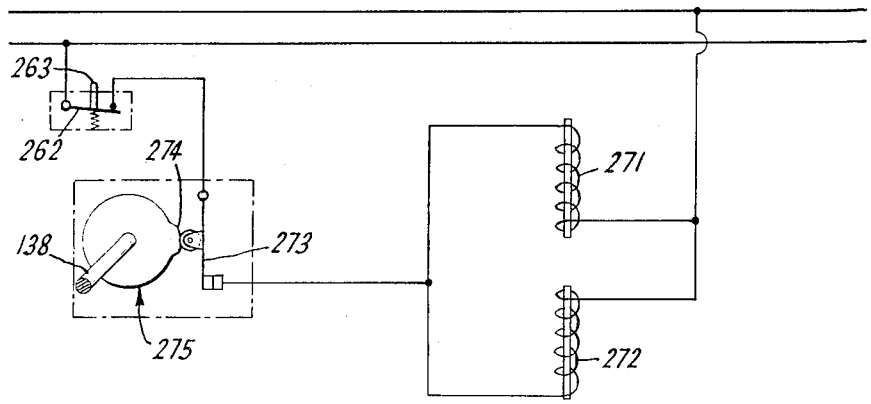
FIG. 19 is a pictorial wiring diagram of the electrical control system for the solenoid actuated latch mechanisms associated with the paste applying and wrapper delivery devices.
Figure 18:
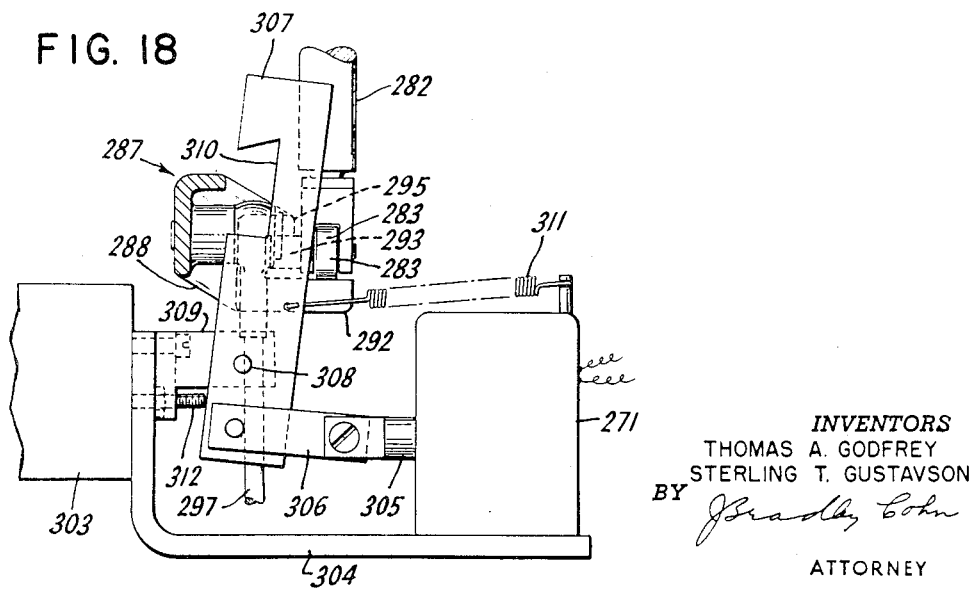
FIG. 18 is a vertical section on the line 18—18 of FIG. 16.

Returning to FIGS. 12–14, the gripper arm 229 mounts a microswitch 262 which controls the circuits of solenoids which are adapted to engage latches (to be described hereinafter) to inactive the delivery of a cigar wrapper to the carrier C and the application of paste from the paste applying device P if there is no cigar bunch in the transfer device B swinging from the crimper H to the wrapping device R. The microswitch 262 serves as a sensing switch to indicate if a bunch is not present between the gripper jaws 232 and 233. The switch 262 is normally closed. A lever 263 is pivoted at an intermediate point to the gripper arm 229 at 264. The upper arm 265 of said lever is disposed adjacent the switch actuator and normally biased away from same by means of a spring 266, this biasing movement being limited by an L-shaped rod 268 extending from the gripper arm 229 and around the back of lever arm 265. The lower arm 267 of lever 265 is provided with a cylindrical convex-faced feeler 269 which extends through an opening 270 in gripper jaw 233. When a cigar bunch is present between closed gripper jaws 232 and 233 (see FIG. 13) the feeler 269 is pushed out by the cigar G, thereby pivoting lever 263 to open switch 262 and break the solenoid circuits shown in FIG. 19. It is only when a cigar bunch is not present between the gripper jaws 232 and 233 that the switch 262 remains closed and energizes the solenoids 271 and 272 which thereby actuate latches which incapacitate the paste applying and wrapper delivery mechanisms, as will be described hereinafter. Furthermore, the solenoids are energized to actuate their associated latches only when a cigar bunch is not present between the transfer gripper jaws 232 and 233 during the swing of the bunch transfer arm 224 from the cigar crimper H to the wrapping device R (FIG. 1); to this end there is coupled in series with the switch 262 a timer switch 273 (see also FIG. 8) mounted on the wrapping device frame 100, which switch is normally open but adapted to be closed by a lobe 274 on a timer cam 275 fixed to the main drive and cam shaft 138 of the wrapping device R.

In FIGS. 15–19 there is shown the mechanism for inactivating the delivery of a die-cut wrapper from the die D of a duplex wrapper die turret T of a conventional cigar making machine, for example, as disclosed in U.S. Patent 1,888,788 issued to S. Clausen. The turret T is rotatable atop a housing 276 of the cigar machine by reason of a vertical turret shaft 277 which mounts the turret T and is rotatably indexed in synchronism with the cam and drive shaft 278 of the cigar machine.

The turret T mounts a pair of die shells 279, each housing a vertically reciprocable die block or head 280 and associated stationary cutting knives 281. As disclosed in the aforesaid Clausen Patent 1,888,788, wrapper leaf tobacco is delivered to the die block 280 and held thereto by suction. The turret is then rotatably indexed to a wrapper cutting station where reciprocable cutting rollers (not shown) pass over the die block 280 to cut a shaped cigar wrapper W (see FIG. 1). The turret is then indexed to a position where the die D is disposed beneath the dwelling wrapper carrier C to which the cut wrapper W is transferred and held by suction by raising the die block 280. To that end each die block 280 is mounted on a vertical rod 282 slidable in a sleeve 285, at the bottoms of which rods are mounted rollers 283 which travel on a circular track 284 atop housing 276. At the wrapper transfer position of the turret T, the track 284 is provided with a cut-out portion 286 (FIG. 17) in which is positioned one end 288 of a horizontal lever 287 pivoted at its other end to a shaft 290 extending from a cigar machine frame member 289. Lever end 288 is provided with a horizontally bifurcated extension 291. The upper surface of the lower fork 292 of the bifurcation is normally positioned in the same plane as the surface of track 284, and a lug 293 extending from the roller shaft 294 is adapted to contact the underside of the upper fork 295 of the bifurcation.

An intermediate portion 296 of lever 287 is linked by a vertical rod 297 to one end of a lever 298 the other end of which is suitably pivoted at 299 to a shaft on the machine frame. An intermediate portion of the lever 298 mounts a cam roller 300 adapted to follow a cam 301 on the cam shaft 278. The roller 300 is normally maintained in contact with cam 301 by means of a tension spring 302 working between lever 298 and a frame member 303. The normal operation of the apparatus so far described is that when the turret is indexed with a cut wrapper on die block 280 below a momentarily dwelling wrapper carrier, the rotation of cam 301 is timed to present a low point to the cam roller 300 whereby, under action of spring 302, the lever 287 is oscillated and the die block 280 is momentarily raised to transfer a cut wrapper to the carrier, this last action being effected by reason of the engagement of the bifurcated end 288 of lever 287 with the roller 283 and lug 293 at the bottom of die block supporting rod 282.

A solenoid 271 is mounted on a bracket 304 extending from the frame member 303, and the solenoid plunger 305 is linked by a bar 306 to the lower end of a vertically disposed latch bar 307 pivoted at an intermediate point 308 to a bracket 309 extending from frame member 303. The latch bar 307 is disposed adjacent the wrapper die reciprocating lever 287 and at an upper portion opposite the lever is provided with a generally rectangular recess 310 whereby upon energizing the solenoid 271 the latch is pivoted to engage the lever 287, the latter being accommodated within the latch recess 310 and thus inactivated. Normally, the latch 307 is disengaged by means of a tension spring 311 working between the latch and the housing of solenoid 271, this biasing action being limited by an adjustable stop screw 312 in bracket 304, the head of the screw being adapted to abut the edge of latch 307 in a predetermined retracted or disengaged position. As explained hereinabove, solenoid 271 is energized only when there is no cigar bunch in the transfer device B while the latter is moving from the bunch crimper H to the cigar wrapping device R (FIG. 1). The engagement of latch 307 with lever 287 prevents the die block 280 from moving up to deliver a wrapper to the carrier, the wrapper so undelivered being returned to the operator of the cigar machine upon subsequent indexing of the wrapper die turret T.

Under the condition when no wrapper is delivered to the carrier C, it is necessary to inactivate the wrapper pasting device P to prevent clogging and fouling the wrapper carrier bottom and the mechanism for accomplishing this is shown in FIGS. 2, 4 and 4A.

Cam lever 54, which actuates the paste applying plate 20 under the bias of tension spring 82 when the cam roller 56 falls into a low portion of cam 58, is provided with an extension which mounts a transverse pin 313 which is adapted to be engaged by a latch 314 under the hereinabove specified conditions whereby the cam lever is prevented from oscillating and actuating the paste applying plate 20.

The latch 314 is in the form of an elongated bar pivoted at an intermediate point thereof to a shaft 315 mounted in a bracket 317 on the machine bed 318. One end of the latch 314 is disposed over the cam lever 54 and provided with an elongated rectangular notch 316. The other end of latch 314 is normally biased downward by means of a tension spring 319 working between said other lever end and the machine bed 318, and the same lever end is linked by an adjustable rod 320 to the plunger 321 of a solenoid 272 mounted on a frame member 322. The biasing action of tension spring 319 is limited by a stop screw 323 adjustably threaded in an extension 324 of bracket 317 and adapted to contact the edge of latch 314 at a predetermined oscillated position of the latter. Normally, the end of latch 314 provided with notch 316 is biased upwardly, as viewed in FIG. 4A, and the cam lever 56 is free to oscillate to actuate the paste applying plate (FIG. 2). However, when a cigar bunch is not present in the transfer device while the latter is moving from the bunch crimper, to the cigar wrapping device, solenoid 272 is energized, as explained hereinabove, and the plunger 321 oscillates the latch 314 clockwise, as viewed in FIG. 4A, whereby the cam lever pin 313 engages the latch notch edge 325. Under this condition the bias of cam lever spring 82 is nullified and the paste applying plate 20 (FIG. 2) is inactivated, thus preventing the fouling and clogging of the bottom surface of wrapper carrier C when no wrapper is held thereon.

The preferred embodiment of the invention disclosed hereinabove is only illustrative, as equivalent modifications within the scope of the appended claims will be obvious to those skilled in the art.

We claim:

1. A method of applying a wrapper to a cigar bunch which comprises applying paste to substantially the entire surface of one face of a length of tobacco wrapper material, winding the pasted wrapper spirally around the cigar in such manner that one edge of said wrapper overlaps an adjacent edge of said wrapper, applying slight longitudinal tension and with a transverse tension gradient to said wrapper during the winding step to impart a higher tension in the overlapping edge portion of the spirally wound wrapper than at the other edge portion of said wrapper.

2. In a method of enveloping a cigar bunch with a preshaped length of web of tobacco wrapper material, the steps of applying an adhesive over substantially the entire surface of one face of said wrapper and thereupon winding said pasted wrapper spirally around the cigar bunch in such manner that the adjacent turns of the spiral winding overlap at adjacent edges, and simultaneously with the winding step imparting a slight tension to the wrapper lengthwise thereof and also simultaneously with the winding step imparting a higher tension to that edge portion of the wrapper which forms the overlap of the spiral winding than at the other edge portion of said wrapper.

3. The method of claim 2, in which said higher tension is imparted by establishing a transverse gradient in the wrapper tension by canting the wrapper transversely as it is being spiralled around the bunch.

4. As an article of manufacture, a cigar comprising a bunch and a spirally wound wrapper, the inner face of said wrapper being pasted along substantially its entire surface, the wrapper being tensioned lengthwise thereof to provide a maximum tension at the overlapping edge portion and a minimum tension at the underlying edge portion and with a substantially uniform tension gradient transversely of the wrapper so that the degree of tension of the overlapping edge portion is greater than that of the other, or underlying, edge portion.

References Cited by the Examiner
UNITED STATES PATENTS

| | | | |
|---|---|---|---|
| 451,737 | 5/1891 | Peck | 131—8 |
| 663,073 | 12/1900 | Coughtry | 131—8 |
| 1,188,549 | 6/1916 | Marsh | 131—35 |
| 1,550,545 | 8/1925 | Hohn | 131—37 |
| 1,824,400 | 9/1931 | Halstead | 131—15 X |
| 1,999,896 | 4/1935 | Dahlstrom | 131—35 |
| 2,192,903 | 3/1940 | Ferenci | 131—21 |
| 2,215,461 | 9/1940 | Clausen | 131—35 |
| 2,226,234 | 12/1940 | Warren | 131—21 |
| 2,651,306 | 9/1953 | Van Buul | 131—37 |
| 2,939,463 | 6/1960 | Granstedt | 131—35 |
| 3,033,210 | 5/1962 | Clausen et al. | 131—37 X |

SAMUEL KOREN, *Primary Examiner.*